(12) United States Patent
Umemura

(10) Patent No.: US 11,443,478 B2
(45) Date of Patent: Sep. 13, 2022

(54) GENERATION APPARATUS, SYSTEM AND METHOD FOR GENERATING VIRTUAL VIEWPOINT IMAGE

(71) Applicant: CANON KABUSHIKI KAISHA, Tokyo (JP)

(72) Inventor: Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/930,092

(22) Filed: Jul. 15, 2020

(65) Prior Publication Data

US 2020/0349756 A1 Nov. 5, 2020

Related U.S. Application Data

(63) Continuation of application No. 16/667,742, filed on Oct. 29, 2019, now Pat. No. 10,755,471, which is a continuation of application No. PCT/JP2018/045977, filed on Dec. 13, 2018.

(30) Foreign Application Priority Data

Dec. 14, 2017 (JP) .............................. JP2017-239888

(51) Int. Cl.
*G06T 15/20* (2011.01)
*G06T 7/55* (2017.01)

(52) U.S. Cl.
CPC ................ *G06T 15/20* (2013.01); *G06T 7/55* (2017.01); *G06T 2207/30196* (2013.01); *G06T 2207/30224* (2013.01)

(58) Field of Classification Search
CPC ....................................................... G06T 15/20
USPC .......................................................... 345/419
See application file for complete search history.

(56) References Cited

U.S. PATENT DOCUMENTS

| | | | |
|---|---|---|---|
| 2009/0128667 A1* | 5/2009 | Gloudemans | G06T 7/13 348/241 |
| 2009/0315978 A1* | 12/2009 | Wurmlin | G06T 7/20 348/43 |
| 2013/0278727 A1* | 10/2013 | Tamir | H04N 13/161 348/47 |

* cited by examiner

*Primary Examiner* — Shivang I Patel
(74) *Attorney, Agent, or Firm* — Canon U.S.A., Inc. I.P. Division

(57) ABSTRACT

To make it possible to obtain a natural virtual viewpoint image in which a structure or the like existing within an image capturing scene is represented three-dimensionally so as to be the same as a real one while suppressing a network load at the time of transmission of multi-viewpoint image data. The generation device according to the present invention generates a virtual viewpoint image based on three-dimensional shape data corresponding to an object, three-dimensional shape data corresponding to a structure, background data corresponding to a background different at least from the object and the structure, and information indicating a virtual viewpoint.

19 Claims, 16 Drawing Sheets

GENERATION APPARATUS, SYSTEM AND METHOD FOR GENERATING VIRTUAL VIEWPOINT IMAGE

CROSS-REFERENCE TO RELATED APPLICATIONS

This application us a Continuation of U.S. patent application Ser. No. 16/667,742 filed Oct. 29, 2019, which is a Continuation of International Patent Application No. PCT/JP2018/045977, filed Dec. 13, 2018, which claims the benefit of Japanese Patent Application No. 2017-239888, filed Dec. 14, 2017, both of which are hereby incorporated by reference herein in their entirety.

BACKGROUND OF THE INVENTION

Field of the Invention

The present invention relates to a technique to generate an image from a virtual viewpoint based on a multi-viewpoint image captured from a plurality of viewpoint positions.

Background Art

In recent years, a virtual viewpoint image technique has been attracting attention, which reproduces an image from a camera that does not exist actually (virtual camera) arranged virtually within a three-dimensional space by using images captured by a plurality of real cameras. According to the virtual viewpoint image technique, for example, it is made possible to view a highlight scene in a game, such as soccer or basketball, from a variety of angles, and therefore, it is possible to give a user a stronger feeling of being at a live performance.

For generation of a virtual viewpoint image, concentration of image data captured by a plurality of real cameras to an image processing server and the like and generation and rendering processing of a three-dimensional model (shape data of an object) in the server and the like may be necessary.

As a method of estimating a three-dimensional shape of an object, a method called "visual volume intersection method (shape-from-silhouette method)" is known (PTL 1).

CITATION LIST

Patent Literature

PTL 1 Japanese Patent Laid-Open No. 2014-10805

SUMMARY OF THE INVENTION

Problem to be Solved by the Invention

With the conventional technique to estimate a three-dimensional shape, for example, there is a concern that a three-dimensional model is not generated for a structure that is a stationary object, such as a soccer goal, existing in the image capturing range. The reason is that the object that is a target of estimation of a three-dimensional shape is a foreground portion, such as a person, which is a moving object within the image capturing range. That is, a structure in a still state, such as a soccer goal, is handled as a background, and therefore, it is not a target of generation of a three-dimensional model. In a case where a virtual viewpoint image is generated in a state where a three-dimensional model of a structure is not generated, the structure or the like that is not moving is represented two-dimensionally behind a person or the like, so that the structure or the like is represented as if it were pasted onto the ground surface or the like, resulting in a video image representation far from an actual image capturing scene. An example thereof is shown in FIG. 1. FIG. 1 is a virtual viewpoint image of one scene of soccer and the image is such that the soccer goal (including all the elements of the goal post, the crossbar, and the goal net) is pasted onto the turf field. Further, FIG. 13B is a virtual viewpoint image of one scene of sumo and the image is such that a sumo wrestler who was pushed out of the sumo ring and fell down from the sumo ring lies down on the sumo ring.

The present invention has been made in view of the above-described problems and an object thereof is to make it possible to obtain a natural virtual viewpoint image in which even a structure or the like, which is a stationary object, is represented three-dimensionally so as to become close to an actual one.

Means for Solving Problem

The system according to the present invention includes: a first generation unit configured to generate, based on a plurality of captured images obtained by image capturing from a plurality of directions, a first image representing a structure area and an object area being distinguished from other areas; a second generation unit configured to generate, based on a plurality of captured images obtained by image capturing from a plurality of directions, a second image representing the object area being distinguished from other areas except for the object area; a transmission unit configured to transmit the first image generated by the first generation unit and the second image; a first acquisition unit configured to acquire, based on the first image and the second image both transmitted from the transmission unit, three-dimensional shape data corresponding to the object; a second acquisition unit configured to acquire, based on the first image transmitted from the transmission unit, three-dimensional shape data corresponding to the structure; a third acquisition unit configured to acquire background data corresponding to an area of a background different at least from the object and the structure; a fourth acquisition unit configured to acquire information indicating a virtual viewpoint; and a third generation unit configured to generate a virtual viewpoint image based on the three-dimensional shape data corresponding to the object acquired by the first acquisition unit, the three-dimensional shape data corresponding to the structure acquired by the second acquisition unit, the background data acquired by the third acquisition unit, and the information indicating the virtual viewpoint acquired by the fourth acquisition unit, and the transmission unit transmits the first image at a frequency lower than that of the second image.

Advantageous Effect of the Invention

According to the present invention, it is possible to obtain a natural virtual viewpoint image in which even a structure or the like, which is a stationary object, is represented three-dimensionally so that the structure or the like becomes close to an actual one.

Further features of the present invention will become apparent from the following description of exemplary embodiments with reference to the attached drawings.

DESCRIPTION OF THE EMBODIMENTS

In the following, with reference to the attached drawings, aspects for embodying the present invention are explained. Configurations shown in each embodiment are merely exemplary and the present invention is not limited to the configurations shown schematically.

First Embodiment

In recent years, due to improvement of image quality of a camera, the resolution of a captured image increases and there is a trend for the data amount thereof to increase. In a case where multi-viewpoint image data captured by a plurality of cameras is transmitted as it is at the time of transmitting the multi-viewpoint image data to a server or the like via a network, a heavy load is imposed on the network. Further, the calculation amount at the time of three-dimensional model generation and rendering processing in the server or the like having received the multi-viewpoint image data also increases. Consequently, in the present embodiment, an aspect is explained in which a natural virtual viewpoint image is obtained, in which a structure or the like existing within the image capturing scene is represented three-dimensionally so as to become close to an actual one, while suppressing the network load at the time of transmission of the multi-viewpoint image data. Specifically, an aspect is explained in which a structure whose still state or state near to the still state continues within the image capturing scene is separated as an object of a unique attribute, neither foreground nor background, and a three-dimensional model of the structure is generated in advance. In the following, explanation is given by taking a case as an example where the soccer game is taken as an image capturing scene and a three-dimensional model of a soccer goal as a structure is generated in advance.

The virtual viewpoint image is a video image that is generated by an end user and/or an appointed operator or the like freely operating the position and orientation of a virtual camera and also called a free-viewpoint image, an arbitrary viewpoint image, and the like. Further, the virtual viewpoint image that is generated or the multi-viewpoint image that is the source of the virtual viewpoint image may be a moving image or a still image. In each embodiment described in the following, an example of a case is explained mainly where both the multi-viewpoint image that is input and the virtual viewpoint image that is output are moving images. The structure in the present embodiment is only required to be a static object (stationary object) whose position does not change in a case where image capturing is performed in a time series from the same angle. For example, in a case where an indoor studio is taken to be an image capturing scene, it is possible to handle furniture or a prop as a structure in the present embodiment.

Figure 1:
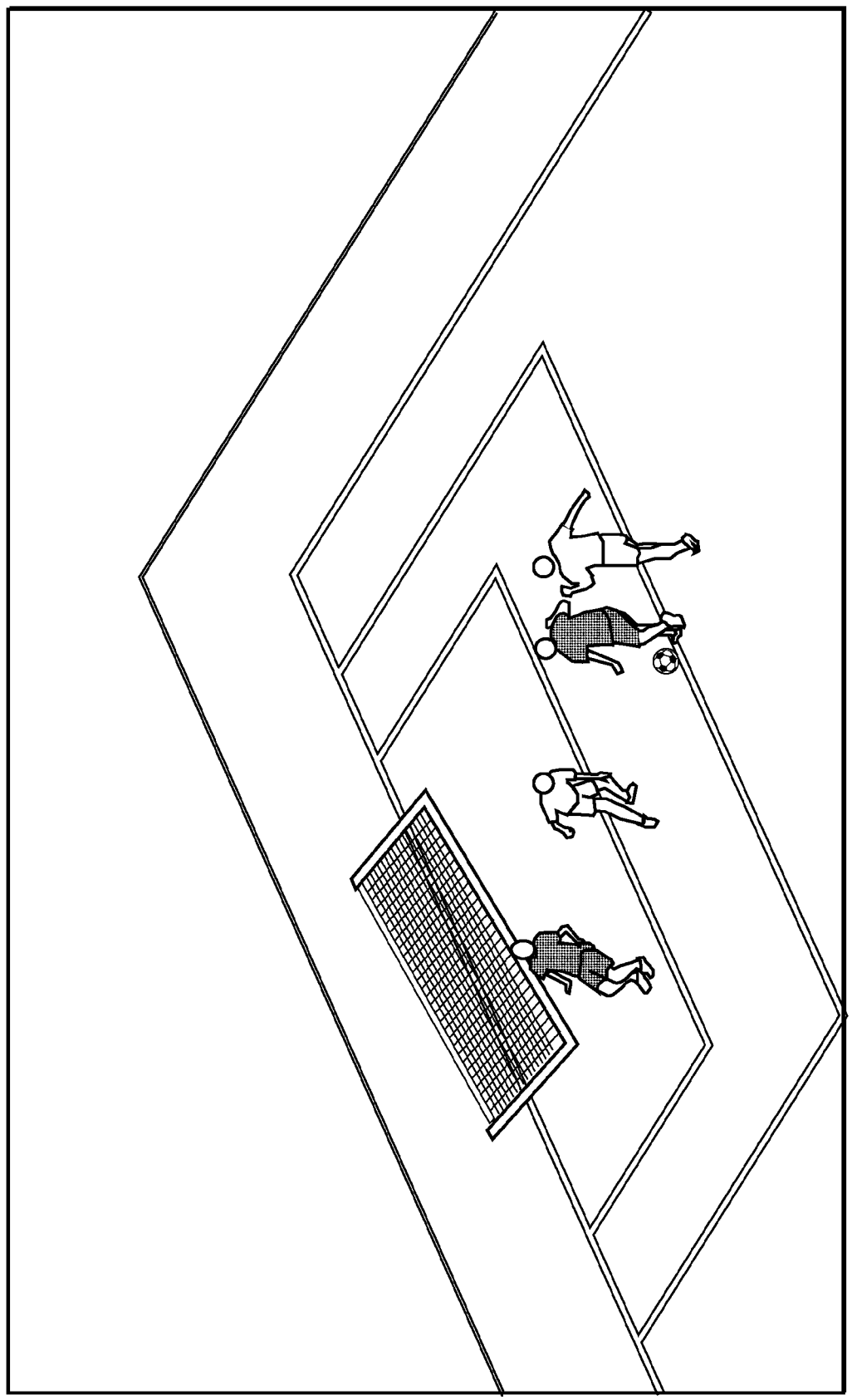
FIG. 1 is a diagram explaining a problem of a conventional method.
Figure 2:
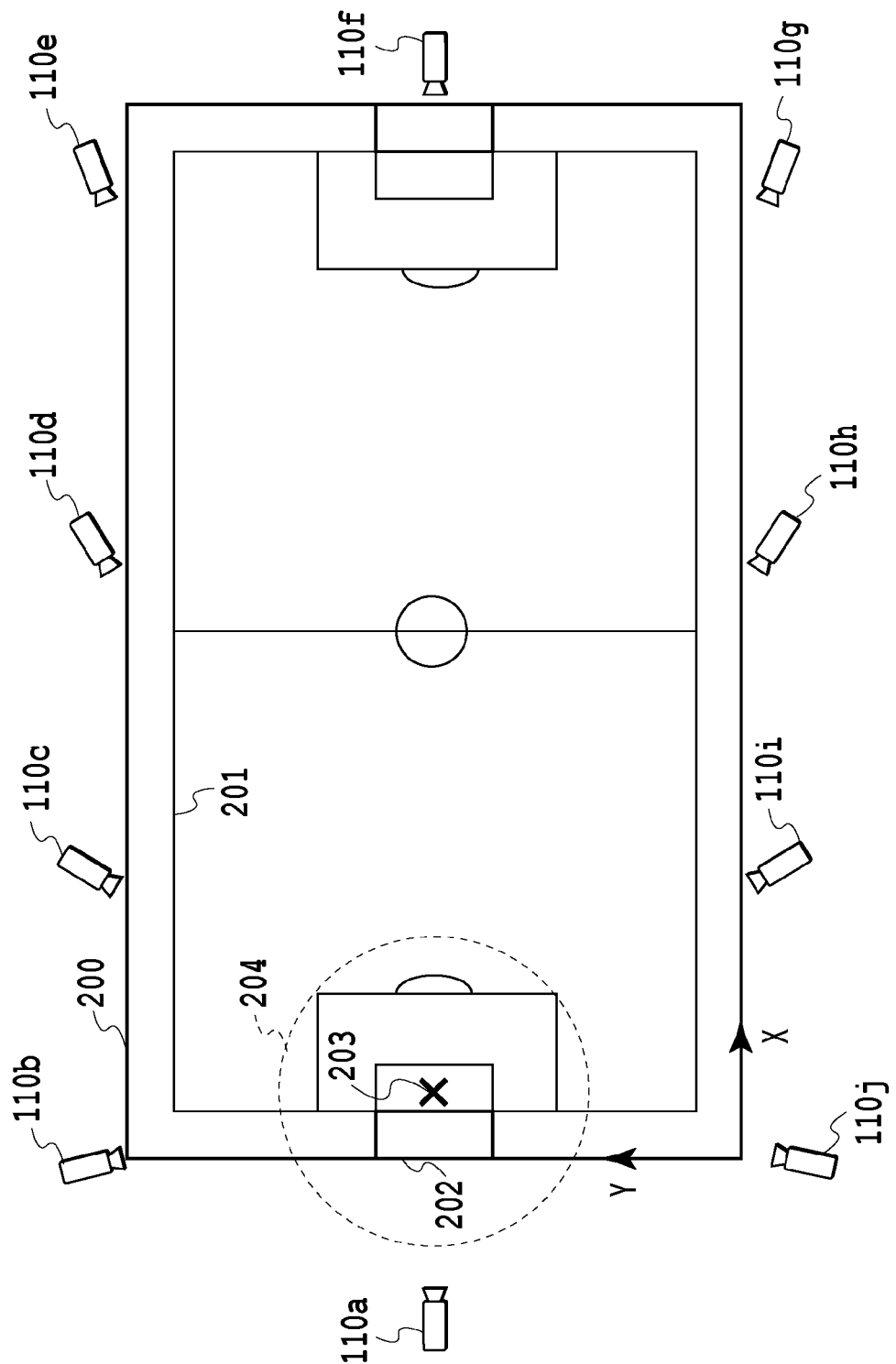
FIG. 2 is a diagram showing an example of arrangement of camera systems according to a first embodiment.

FIG. 2 is a diagram showing arrangement of a total of ten camera systems 110a to 110j configuring a virtual viewpoint image generation system in a bird's eye diagram in a case where a filed 200 is viewed from directly above. Each of the camera systems 110a to 110j is arranged at a predetermined height from the ground so as to surround the field 200 and acquires multi-viewpoint image data whose viewpoint is different from one another by capturing the portion in front of one of goals from a variety of angles. On the turf field 200, a soccer court 201 is drawn (in fact, by white lines) and soccer goals are placed on both the left side and the right side thereof. Further, a × mark 203 in front of a soccer goal 202 on the left side indicates a common line-of-sight direction (gaze point) of the camera systems 110a to 110j and a broken line circle 204 indicates an area that each of the camera systems 110a to 110j can capture with the gaze point 203 as a center. In the present embodiment, it is assumed that a position is represented in a coordinate system in which one of the corners of the field 200 is taken as the origin, the long side direction as an x-axis, the short side direction as a y-axis, and the height direction as a z-axis.

Figure 3:
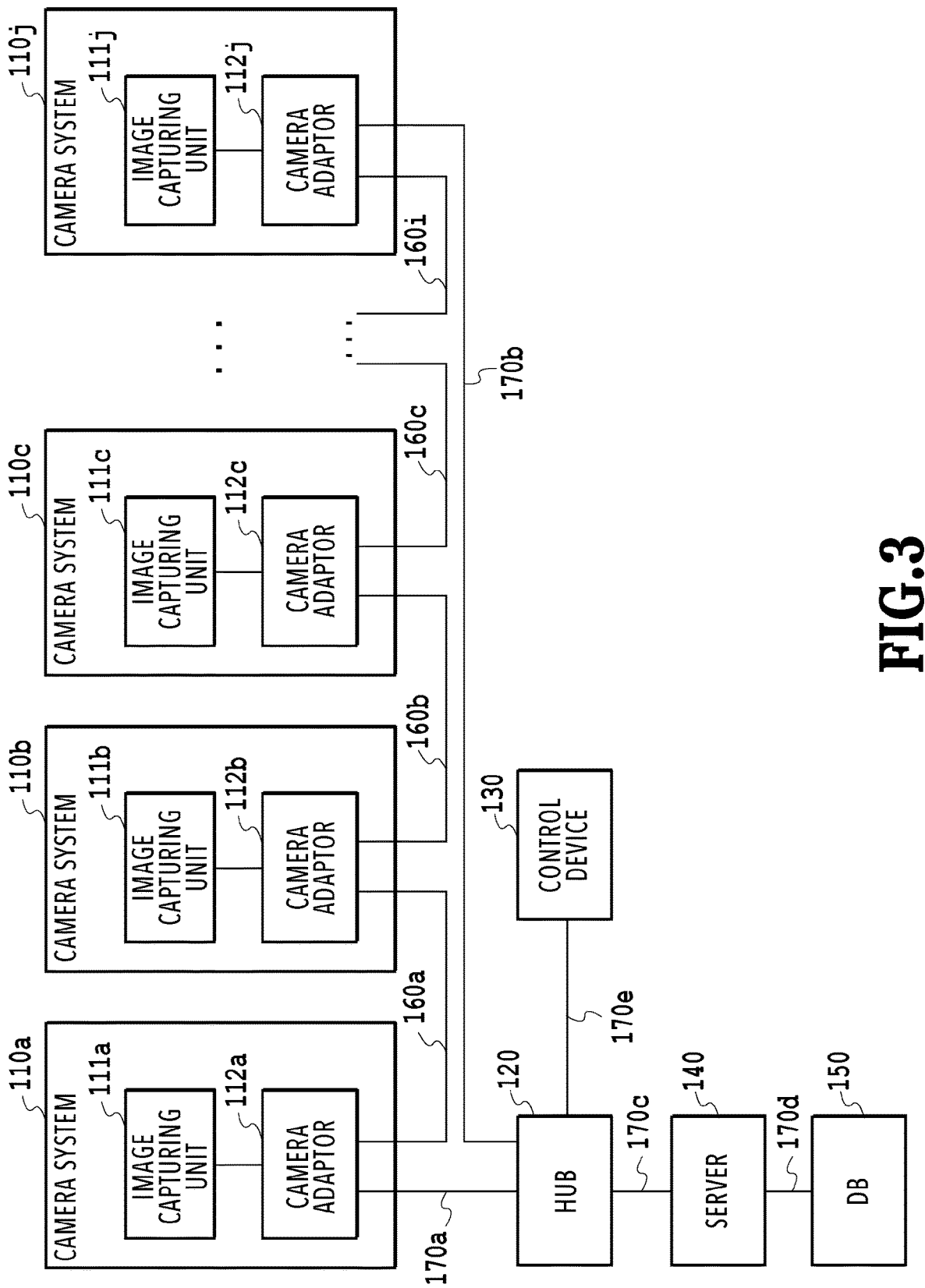
FIG. 3 is a diagram showing an example of a hardware configuration of a virtual viewpoint image generation system.

FIG. 3 is a diagram showing an example of the hardware configuration of the virtual viewpoint image generation system. The virtual viewpoint image generation system in FIG. 3 includes the camera systems 110a to 110j, a switching hub 120, a control device 130, a server 140, and a database 150.

Within each of the camera systems 110a to 110j, image capturing units 111a to 111j each including a lens, an imaging sensor, and the like and camera adaptors 112a to 112j each performing control of the image capturing unit and predetermined image processing in accordance with instructions of the control device 130 are included. The camera adaptor includes a calculation processing device (CPU or ASIC) and memories (RAM and ROM) necessary for control and image processing. Further, the camera systems 110*a* to 110*j* are connected by a daisy chain method in which the adjacent camera systems are connected by each of network cables 160*a* to 160*i*. Image data captured by the camera systems 110*a* to 110*j* is transmitted via the network cables 160*a* to 160*i*. The switching hub (hereinafter, described as "HUB") 120 performs routing of data transmission on a network. The HUB 120 and the camera system 110*a* are connected by a network cable 170*a* and the HUB 120 and the camera system 110*j* are connected by a network cable 170*b*. The server 140 generates virtual viewpoint image data by modifying the multi-viewpoint image data transmitted from the camera systems 110*a* to 110*j*. Further, the server 140 is also in charge of the synchronization control of the entire system by generating a time synchronization signal. The database (hereinafter, described as "DB") 150 accumulates the image data sent from the server 140 and provides the accumulated image data to the server 150 as needed. The HUB 120 and the server 140 are connected by a network cable 170*c*, the server 140 and the DB 150 are connected by a network cable 170*d*, and the HUB 120 and the control device 130 are connected by a network cable 170*e*. The control device 130 centralizedly controls each of the camera systems 110*a* to 110*j* and the server 140. Then, the control device 130 outputs the virtual viewpoint image generated by the server 140 based on the multi-viewpoint image to, for example, a display device, not shown schematically, and another information processing apparatus on the network. In the system configuration shown in FIG. 3, the plurality of camera systems is connected by the daisy chain method, but the star connection in which the HUB 120 and each of the camera systems 110*a* to 110*j* are connected directly with each other may be adopted. Further, the number of camera systems configuring the virtual viewpoint image generation system is not limited to ten.

Here, acquisition of the multi-viewpoint image data in the present embodiment is explained. First, the server 140 transmits the time synchronization signal to each camera system (time server function). In each of the camera systems 110*a* to 110*j*, each of the image capturing units 111*a* to 111*j* performs image capturing in accordance with the received time synchronization signal under the control of the internal camera adaptors 112*a* to 112*j*. Due to this, it is made possible to acquire the multi-viewpoint image by a moving image synchronized in units of frames. Specifically, as described below, the image data captured by each camera system is sequentially transmitted to the server 140. First, in the camera system 110*a*, after image processing, to be described later, is performed for the image data captured by the image capturing unit 11*a* by the camera adaptor 112*a*, the image data is transmitted to the camera system 110*b* via the network cable 160*a*. The camera system 110*b* performs the same processing and transmits the captured image data to the camera system 110*c* along with the captured image data acquired from the camera system 110*a*. The same processing is performed in each camera system and the captured image data corresponding to a total of ten viewpoints, which is acquired by each of the ten camera systems 110*a* to 110*j*, is transmitted to the USB 120 via the network cable 170*b* and sent to the server 140 finally. The server 140 performs generation of a structure model, to be described later, shape estimation of the object, and image processing, such as rendering, by using the received captured image data corresponding to ten viewpoints.

Figure 4:
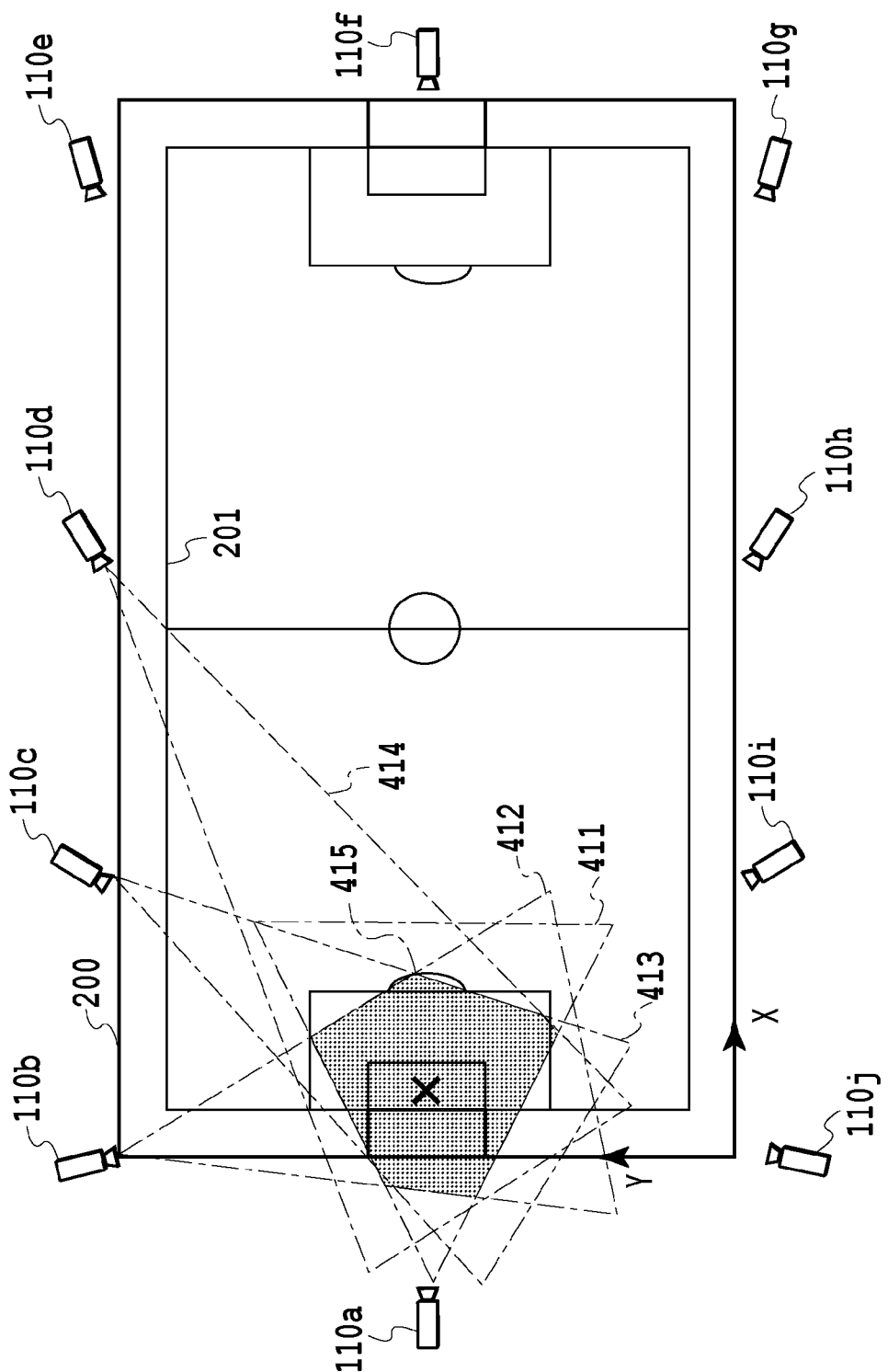
FIG. 4 is a diagram explaining a common image capturing area of a plurality of cameras.

FIG. 4 is a diagram schematically showing an image capturing area of each of the image capturing units 111*a* to 111*d* possessed by each of the four camera systems 110*a* to 110*d* of the above-described ten camera systems on the basis of FIG. 2 described previously. Each of triangular areas 411 to 414 extending from each of the camera systems 110*a* to 110*d* is an image capturing area corresponding to each of the camera systems 110*a* to 110*d*, represented by a visual volume. Then, a polygonal area 415 in which the above four triangular image capturing areas 411 to 414 overlap represents a common image capturing area of the camera systems 110*a* to 110*d*. Here, the common image capturing area is explained by taking a case of the four camera systems as an example, but it is possible to derive the common image capturing area in a total of ten camera systems by the same method. As a matter of course, the common image capturing area in a total of ten camera systems is smaller than the polygonal area 415 described above. As describe above, it is possible to obtain the common image capturing area of a camera group capturing the common gaze point by calculating the overlap area of the visual volume possessed by each camera. Further, it is also possible to similarly derive the three-dimensional model of an object existing in the common image capturing area from the overlap area of the multi-viewpoint image acquired by each camera system.

Figure 5:
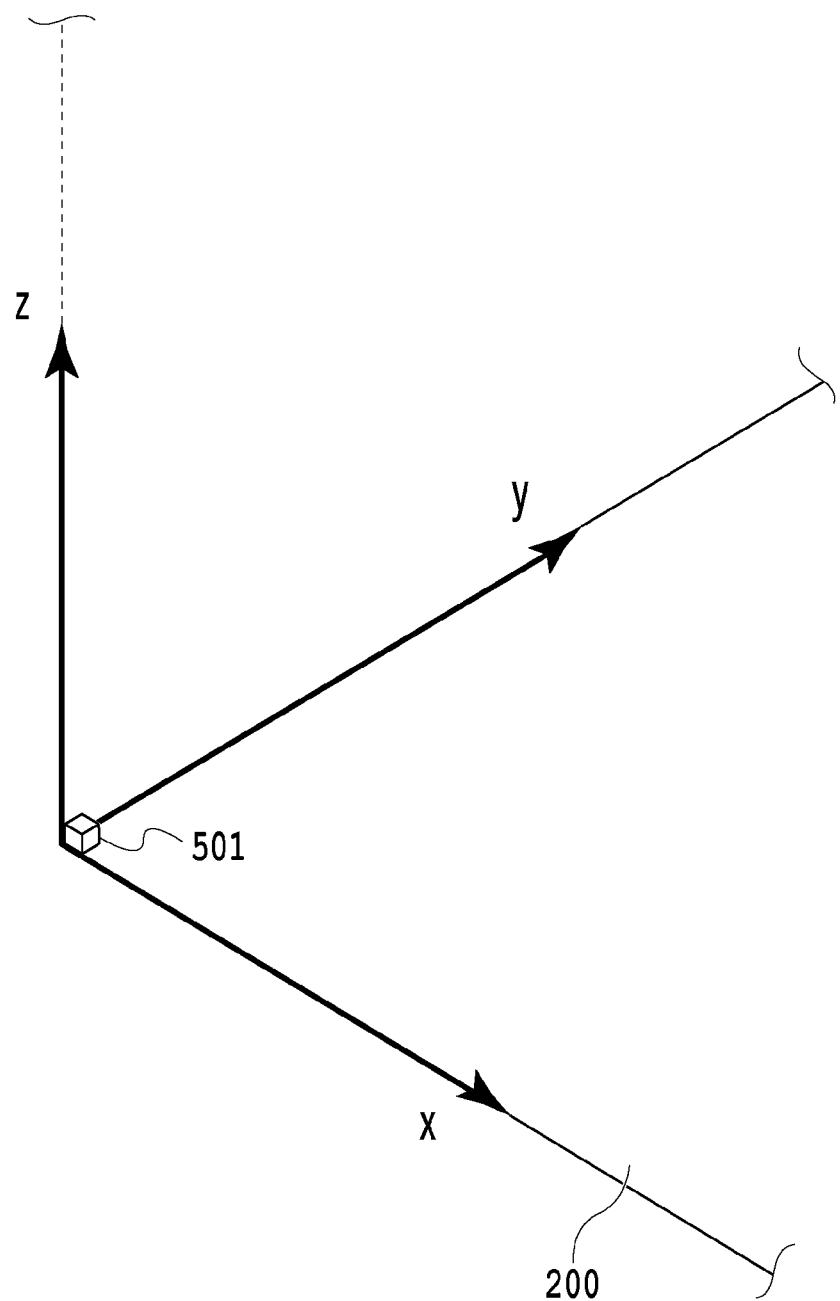
FIG. 5 is an explanatory diagram of volume data.

Next, a method of generating a three-dimensional model of a structure existing within the common image capturing area obtained as described above is explained, which is one of features of the present embodiment. Here, explanation is given by taking a case where a three-dimensional model of the soccer goal 202 is generated as an example. First, volume data (see FIG. 5) in which the three-dimensional space on the field 200 is filled with cubes (voxels) having a predetermined size is prepared. The value of the voxel configuring the volume data is represented by 0 and 1 and "1" indicates an area contributing to shape formation and "0" indicates an area does not contributing to shape formation, respectively. In FIG. 5, symbol 501 indicates a voxel (drawn larger than the actual one for convenience of explanation). Next, the three-dimensional coordinates of the voxel are converted from the world coordinate system into the camera coordinate system by using the camera parameters of the image capturing units 111*a* to 111*j* included in each of the camera systems 110*a* to 110*j*. Then, in a case where there is a structure in the camera coordinate system, a model (structure model) representing the three-dimensional shape of the structure by voxels is generated. The camera parameters refer to information on the installation position and orientation (line-of-sight direction) of each of the image capturing units 111*a* to 111*j*, the focal distance of the lens, and the like.

Figure 6:
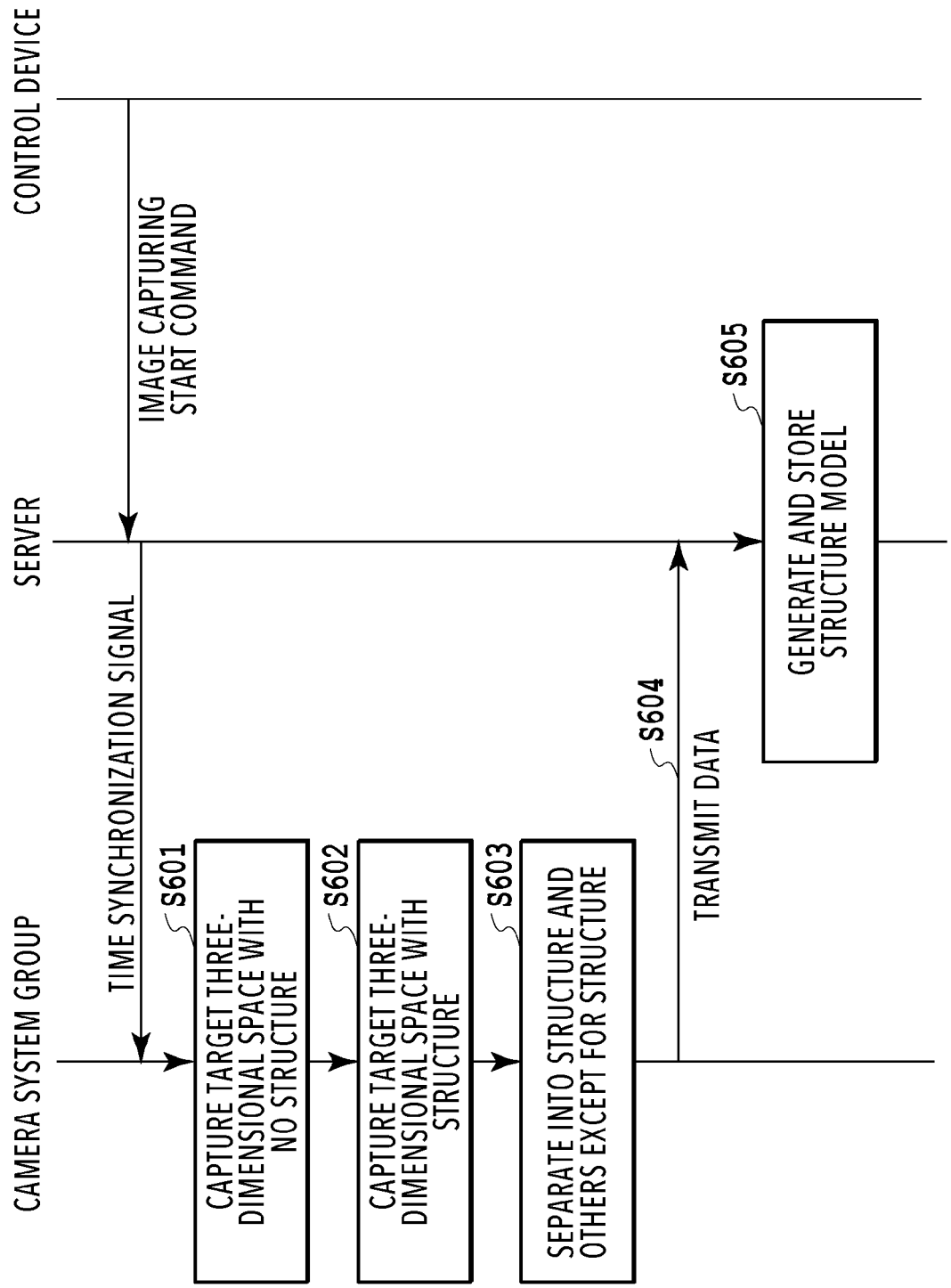
FIG. 6 is a sequence diagram showing a generation process of a structure model according to the first embodiment.

FIG. 6 is a sequence diagram showing a generation process of a model of a structure existing within an image capturing scene. The series of processing shown by the sequence diagram is performed in advance before the start of image capturing (for example, before the start of a game) of a main part of a multi-viewpoint image, which is source data of a virtual viewpoint image, for example, at the time of the setup of the sports stadium, and the like. In FIG. 6, the set of the ten camera systems 110*a* to 110*j* is described as "camera system group".

Figure 7A:
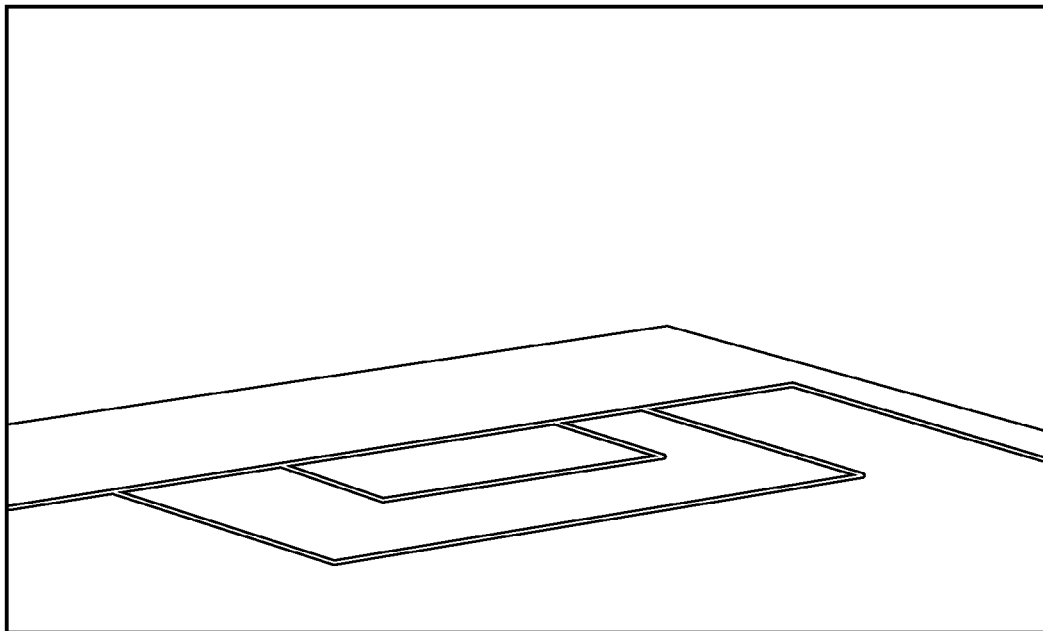
FIG. 7A is a diagram showing a captured image of a filed in a state where there is no soccer goal.

At step 601, each of the image capturing units 111*a* to 111*j* captures the target three-dimensional space (here, the field 200) in the state where there is no structure (here, the soccer goal 202 is not installed yet). FIG. 7A shows an image obtained by the image capturing unit 111*i* of the camera system 110*i* capturing the field 200 in the state without the soccer goal 202. The captured image such as this, whose viewpoint is different from one another, is acquired in each camera system.

Figure 7B:
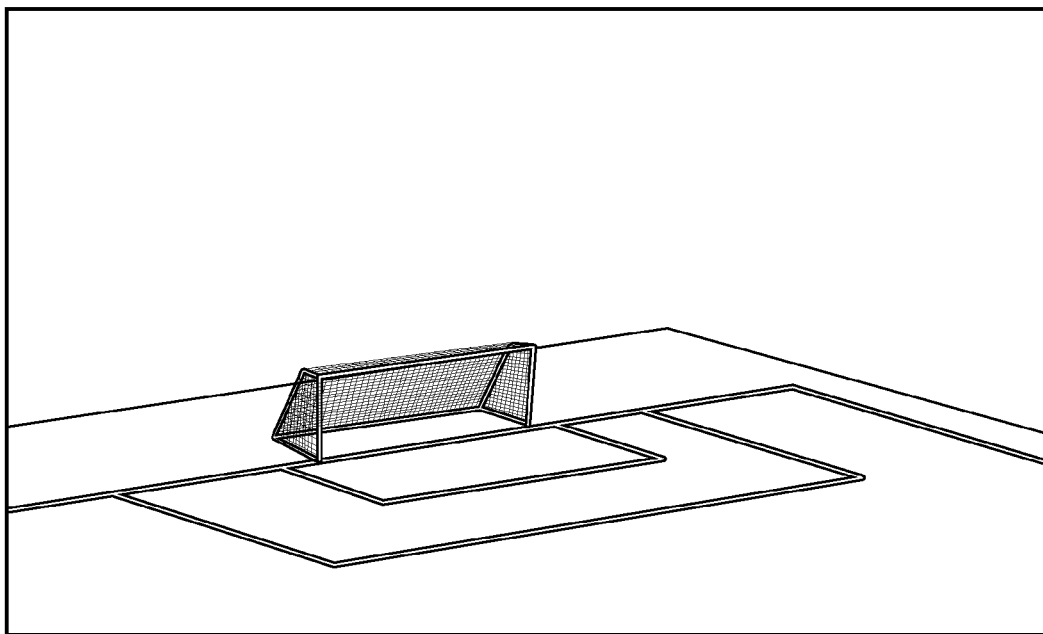
FIG. 7B is a diagram showing a captured image of a filed in a state where there is a soccer goal.

Next, at step 602, each of the image capturing units 111a to 111j captures the target three-dimensional space (field 200) in the state where there is a structure (here, the soccer goal 202 is installed). FIG. 7B shows an image obtained by the image capturing unit 111i of the camera system 110i capturing the field 200 in the state with the soccer goal 202. As in the case with step 601, the captured image such as this, whose viewpoint is different from one another, is acquired in each camera system. It is assumed that the captured image data acquired at steps 601 and 602 is stored in the memory within each of the camera adaptors 112a to 112j.

At 5603, each of the camera adaptors 112a to 112j separates the image area into the image area in which a structure is captured and the image area in which a background except for the structure is captured from the difference between the captured image obtained at step 601 and the captured image obtained at step 602. Due to this, the image data corresponding to the structure (here, the soccer goal 202) and the image data corresponding to the background (here, the field 200) except for the structure are obtained.

At step 604, each of the camera adaptors 112a to 112j transmits the image data corresponding to the structure and the image data corresponding to the background, both obtained at step 603, to the server 140.

Figure 8:
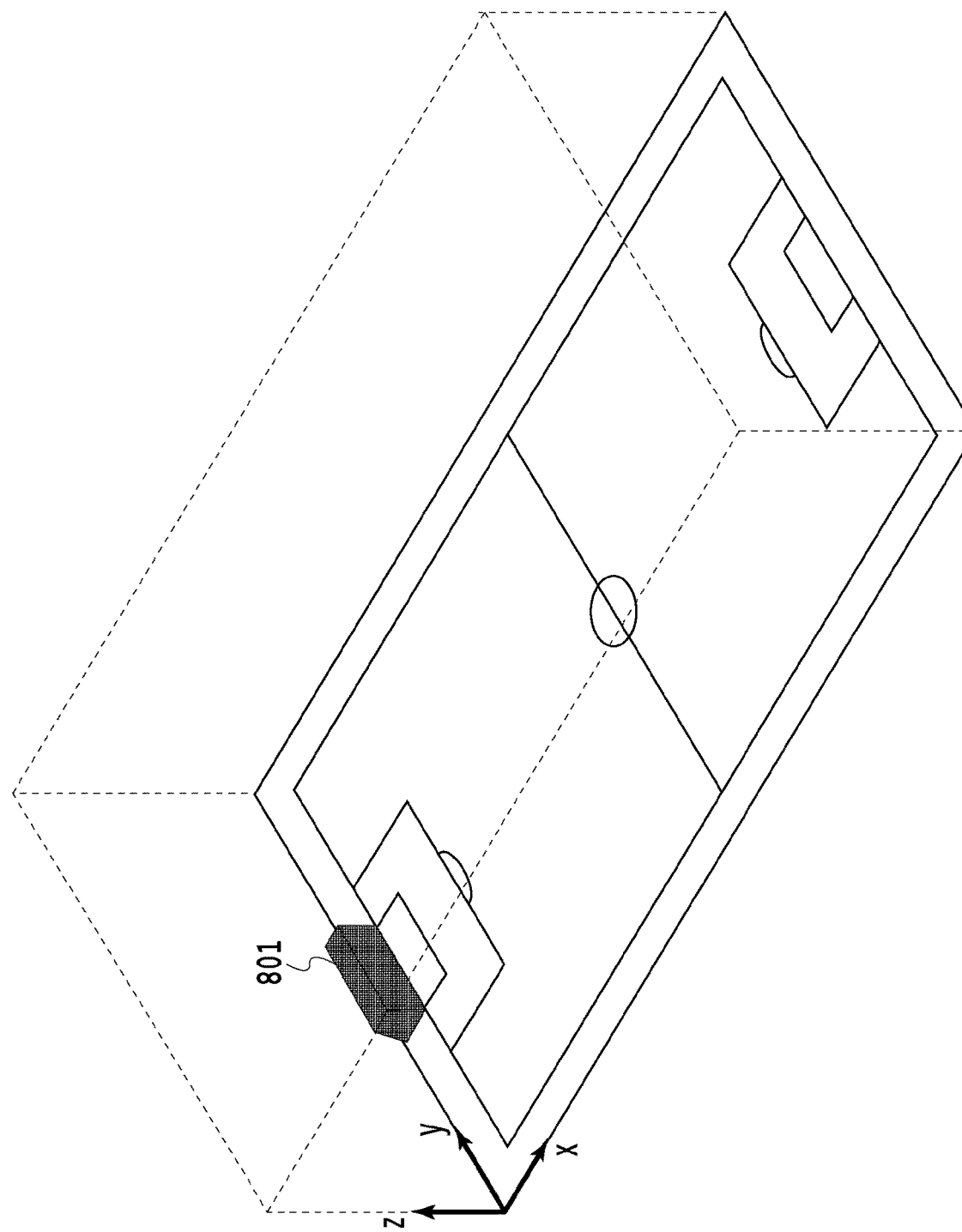
FIG. 8 is a diagram showing a three-dimensional model of a soccer goal on volume data.

At step 605, the server 140 generates a three-dimensional model of the structure (here, the soccer goal 202) configured by voxels described previously based on the image data of the structure received from each camera system and the camera parameters of each camera system. FIG. 8 is a diagram showing the three-dimensional model of the soccer goal 202 on the volume data described previously. It may also be possible to represent the three-dimensional shape by a set of points (point cloud), each indicating the center of a voxel, in place of the voxel itself. The structure model thus generated is stored in the memory or the DB 150 within the server 140. Further, the background image data received along with the structure image data is also stored together.

The above is the flow of the processing at the time of generating a structure model within an image capturing scene. It may also be possible to generate a three-dimensional model of another structure, for example, such as a corner flag, by the same method. In the present embodiment, separation of the structure and the background except for the structure is performed on the side of the camera adaptor, but is may also be possible to perform separation on the side of the server 140.

Figure 9:
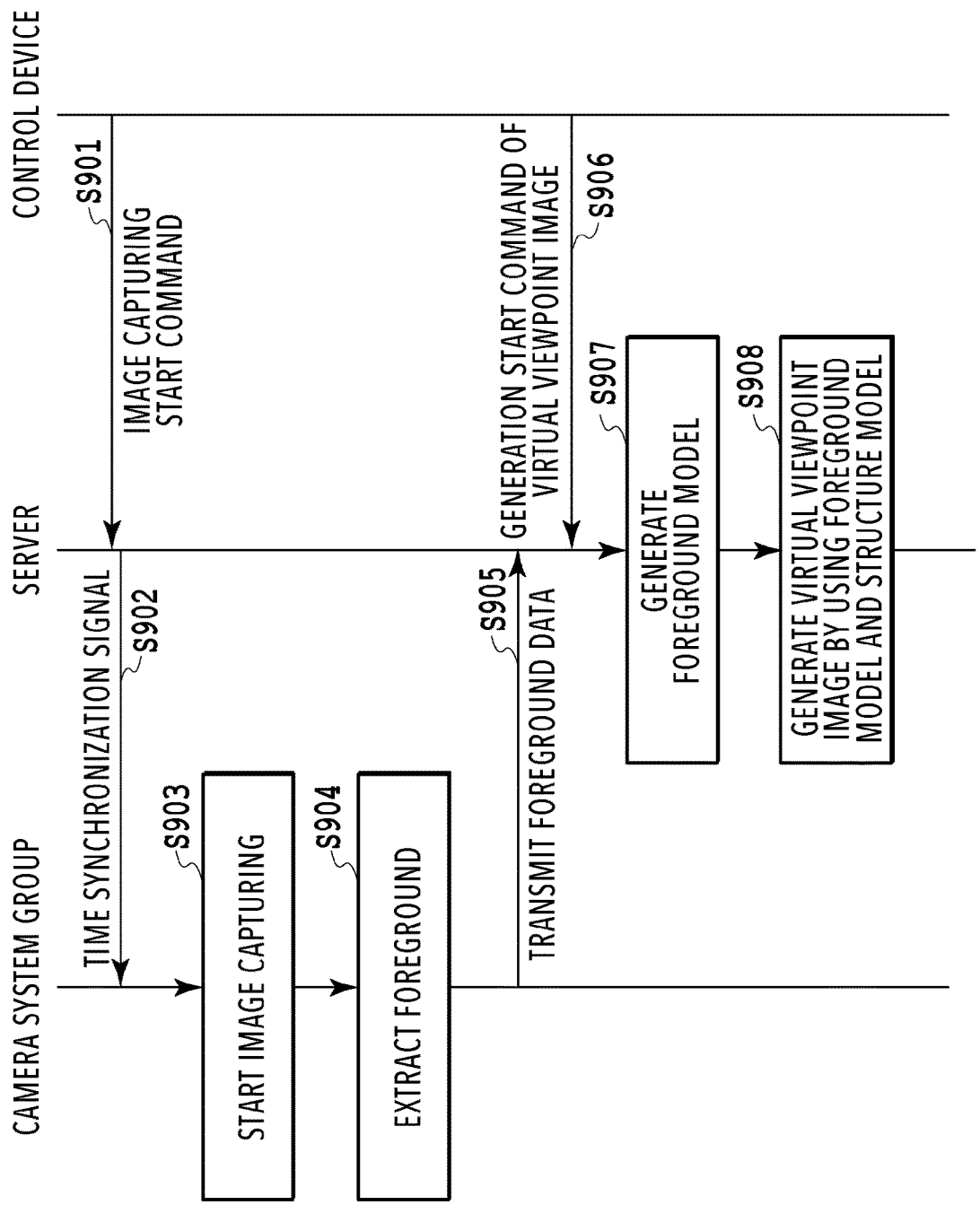
FIG. 9 is a sequence diagram showing a generation process of a virtual viewpoint image according to the first embodiment.

Following the above, generation of a virtual viewpoint image in which a structure existing within an image capturing scene is represented without a sense of incongruity by using the structure model obtained as described above is explained. FIG. 9 is a sequence diagram showing a generation process of a virtual viewpoint image according to the present embodiment. As in the case with the sequence diagram in FIG. 6, the set of the ten camera systems 110a to 110j is described as "camera system group".

Figure 10A:
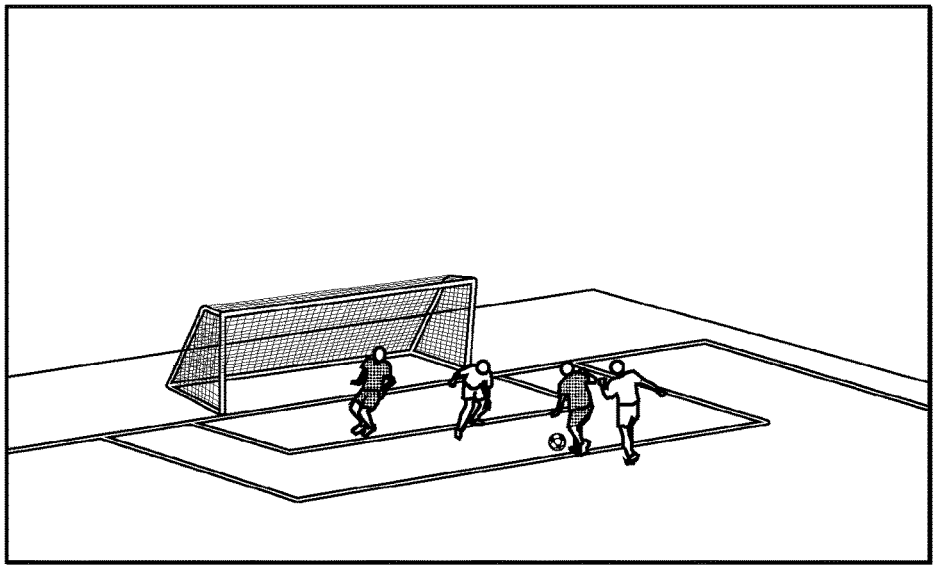
FIG. 10A is a diagram showing an example of a captured image.

In accordance with the start of a soccer game, or the like, at step 901, the control device 130 sends instructions to capture a multi-viewpoint image (image capturing start command), which is the source of a virtual viewpoint image, to the server 140. At step 902 that follows, upon receipt of the image capturing instructions from the control device 130, the server 140 transmits the time synchronization signal to each of the camera systems 110a to 110j. Then, at step 903, each of the camera systems 110a to 110j starts image capturing of the target three-dimensional space (here, three-dimensional space on the field 200). Due to this, for example, in the camera system 110i, an image during a soccer game as shown in FIG. 10A is obtained. Then, image capturing of the image such as this, whose viewpoint is different from one another, is performed in each camera system.

Figure 10B:
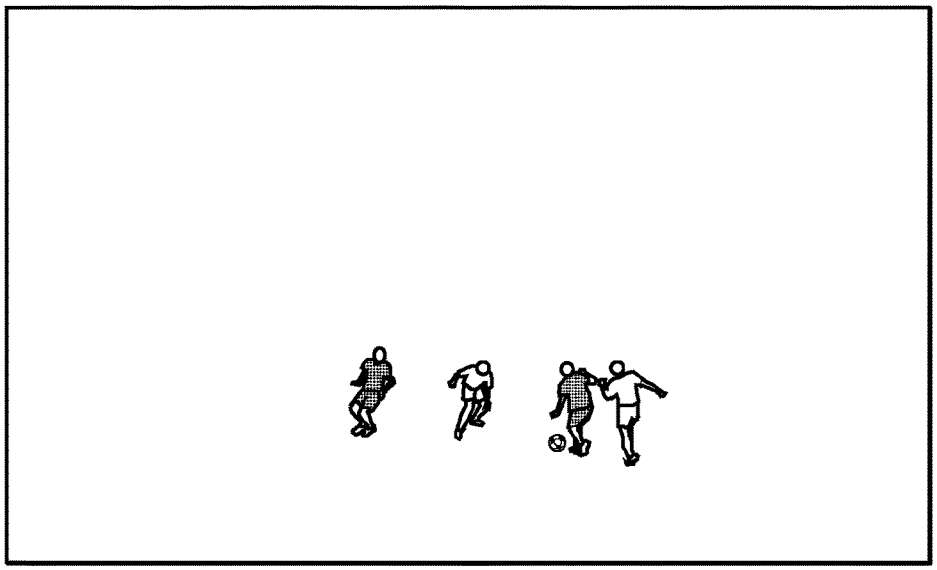
FIG. 10B is a diagram showing an example of a foreground image.

At step 904, in each of the camera adaptors 112a to 112j, processing to extract data of the foreground including moving objects (here, player and ball) from the captured image acquired at step 903 is performed. This extraction processing can be said in other words as the processing to separate the captured image into the foreground and the background based a difference obtained by comparing the captured image acquired at step 903 with the captured image (FIG. 7B) including the structure, which is acquired at step 602 described previously. FIG. 10B shows the image of only the foreground, which is extracted from the captured image (whole image) in FIG. 10A. At step 905 that follows, each of the camera adaptors 112a to 112j transmits the image data of the extracted foreground to the server 140. At this time, the image area (image data of background) corresponding to the field 200 and the soccer goal 202 is not transmitted to the server 140. By doing so, the data transmission amount is suppressed accordingly.

At step 906, based on user instructions, the control device 130 transmits instructions to generate a virtual viewpoint image (generation start command) to the server 140 along with the information relating to the virtual viewpoint and the gaze point. At this time, a user who desires to create and view a virtual viewpoint image inputs information necessary for generation of a virtual viewpoint image via a GUI (not shown schematically) included in the control device 130. Specifically, a user sets information necessary for generation of a virtual viewpoint image (hereinafter, called "virtual viewpoint information"), such as the position and the moving path of the virtual viewpoint, and further, which (which object) is gazed at, via a predetermined UI screen.

Figure 11:
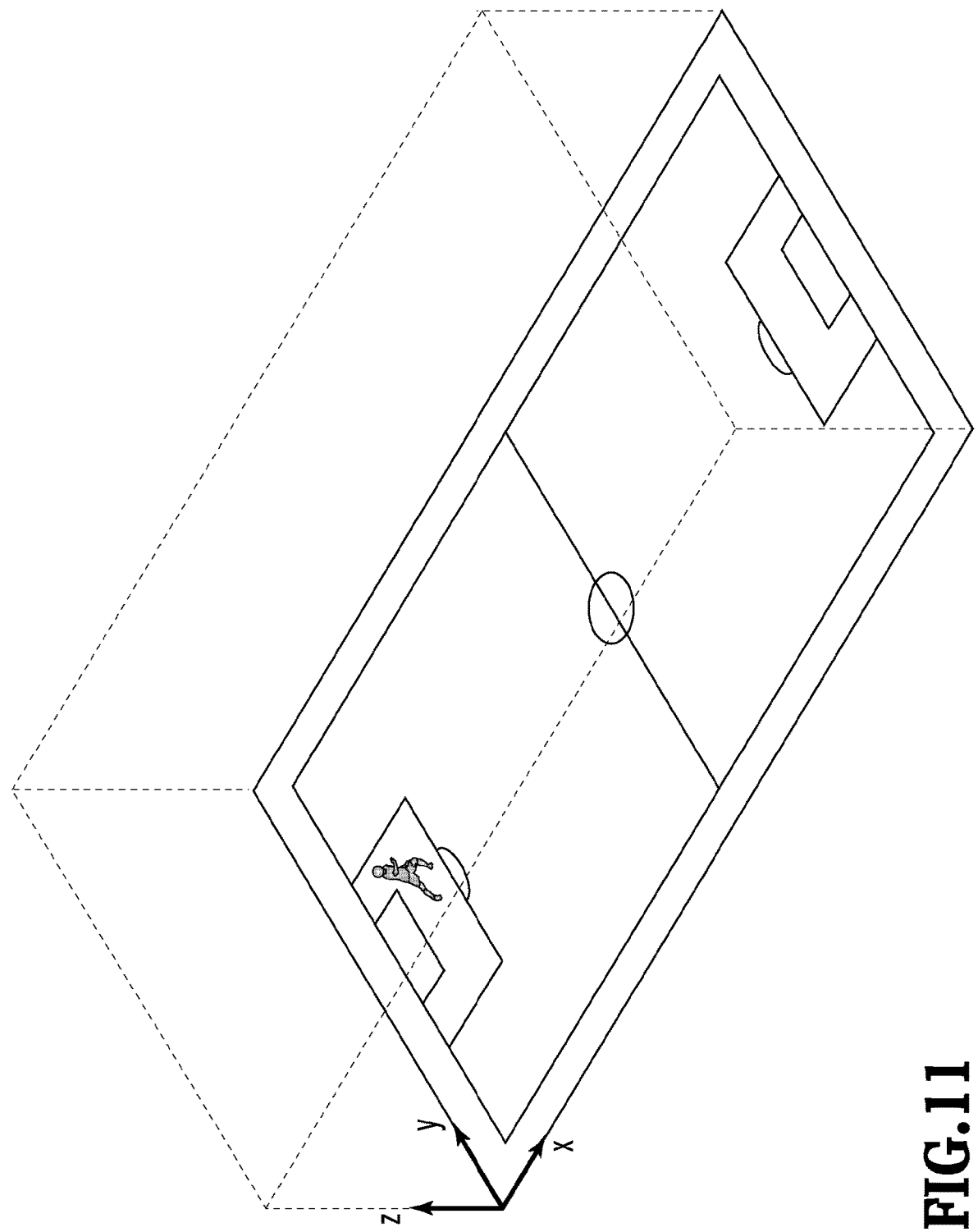
FIG. 11 is a diagram showing a three-dimensional model of a player on volume data.

At step 907, the server 140 generates a three-dimensional model (foreground model) of a moving object within the image capturing scene by using the image data of the foreground and the camera parameters described previously, which are received from the camera group. Here, the three-dimensional models of the players and the ball are generated as the foreground model. FIG. 11 is a diagram showing the three-dimensional model corresponding to one certain player of the three-dimensional models of the players and the ball generated at this step on the volume data as in FIG. 8 described previously.

Figure 10C:
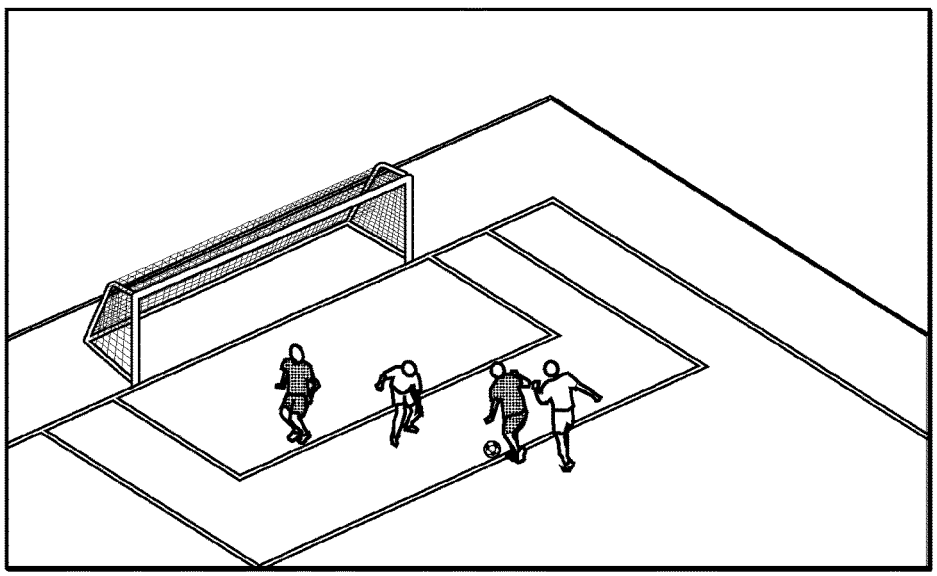
FIG. 10C is a diagram showing an example of a virtual viewpoint image.

At step 908, the server 140 generates a virtual viewpoint image by using the virtual viewpoint information received from the control device 130, the foreground model acquired at step 907, and the structure model and the background data generated and acquired in advance. Specifically, the shape of each of the structure model and the foreground model in a case where they are viewed from a set virtual viewpoint (virtual camera) is estimated by using, for example, the shape-from-silhouette method. As a result of the shape estimation processing, volume data representing the three-dimensional shape of an object existing within the image capturing scene is obtained. In a case where the three-dimensional shape of an object viewed from a virtual viewpoint is obtained, next, the three-dimensional shapes of these objects are combined into one image. At the time of combination processing, in a case where the distance between the set virtual viewpoint and the foreground model is shorter than that between the set virtual viewpoint and the structure model, the foreground model is mapped from above the structure model. On the contrary, in a case where the structure model is nearer to the virtual viewpoint than the foreground model, the structure model is mapped from above the foreground model. In this manner, for example, the virtual viewpoint image in a case where the point to which the viewpoint from the image capturing unit 111$i$ of the camera system 110$i$ is moved in the height direction (+z direction) is taken to be the virtual viewpoint will be the image as shown in FIG. 10C. In the virtual viewpoint image shown in FIG. 10C, it is known that the players and the ball, which are the foreground model, and the soccer goal, which is the structure model, are each mapped onto the field 200 in a natural three-dimensional shape. By repeating the processing such as this the number of times corresponding to the number of time frames set separately, a desired virtual viewpoint image by a moving image is obtained.

In the present embodiment, an attempt is made to suppress the total data transmission amount by not transmitting the background image data in the least in the sequence in FIG. 9. In this case, for example, in capturing a moving image of a sports scene outdoors, the sunshine condition or the like changes over time, and therefore, such a problem that the background portion in a finished virtual viewpoint image is different from the actual one may arise. In a case where there is a concern of such a problem, it may also be possible to appropriately transmit background image data obtained by the foreground/background separation at step 904 between transmissions of the foreground image data.

Further, in the present embodiment, generation of the structure model and generation of the foreground model are performed by the server 140, but this is not limited. For example, it may also be possible for the camera adaptor to generate the structure model and transmit the structure model to the server 140. Alternatively, it may also be possible for the server 140 to acquire the data of the structure model generated by another information processing apparatus. What is required is that the state where it is possible for the server 140 to use the structure model is brought about in the stage of generating the foreground model from the foreground data extracted from the multi-viewpoint image.

Modification Example

In the above-described example, an attempt is made to reduce the data transmission amount by handling the structure within the image capturing scene as an object of a unique attribute, neither foreground nor background, and generating and storing in advance the three-dimensional model of the structure. From the point of view of a reduction in the data transmission amount, it is also possible to attain the object by handling the three-dimensional model of the structure as a background. However, in a case where the structure model is handled as a background, the following problem occurs.

Figure 12:
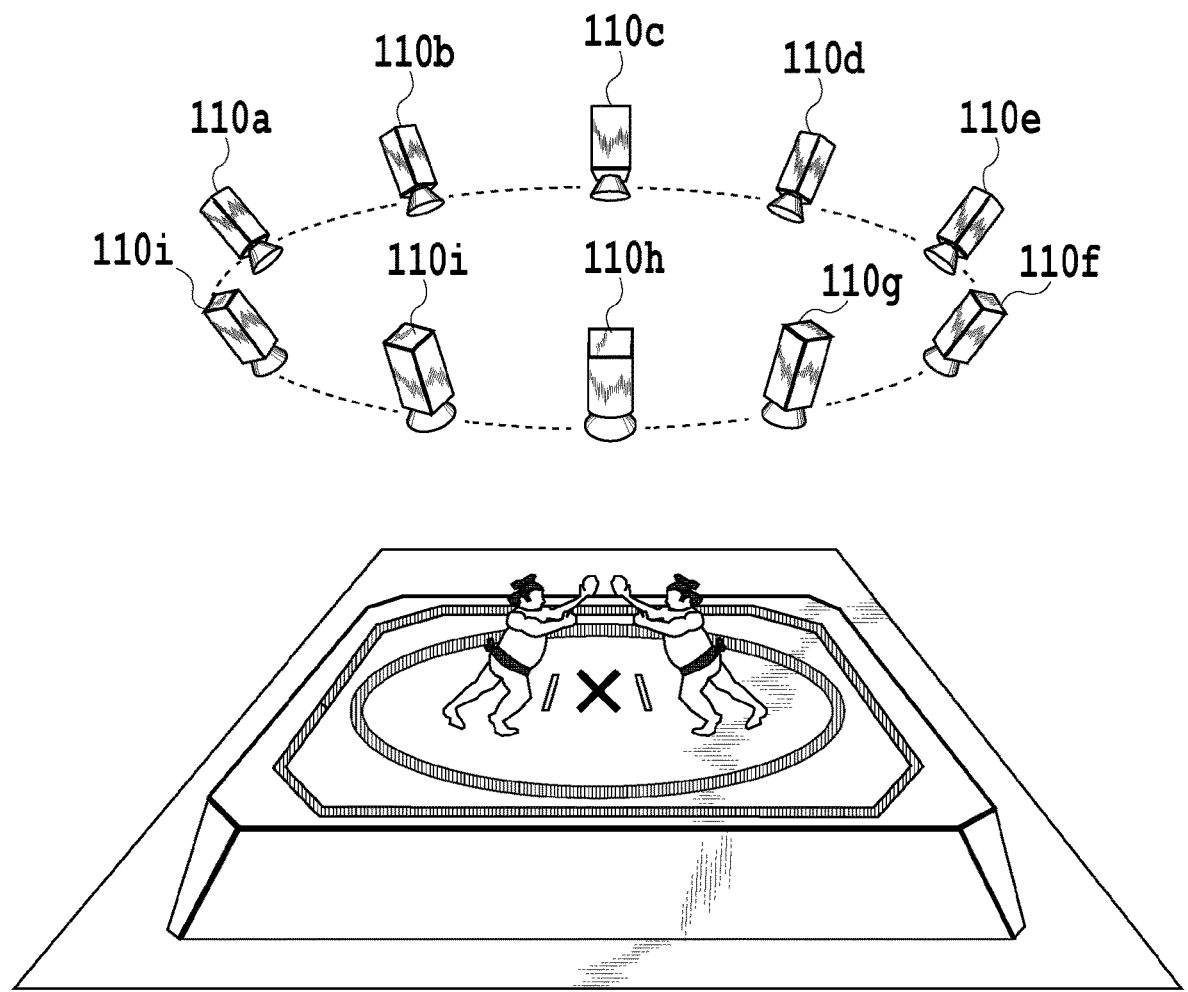
FIG. 12 is a diagram showing an example of arrangement of camera systems according to a modification example of the first embodiment.

FIG. 12 is a diagram showing arrangement of a total of the ten camera systems 110$a$ to 110$j$ configuring the virtual viewpoint image generation system according to the present modification example in a case where the image capturing scene is sumo. Each of the camera systems 110$a$ to 110$j$ is installed at the ceiling of the sumo venue so as to surround the sumo ring and acquires multi-viewpoint image data whose viewpoint is different from one another by capturing the sumo ring from a variety of angles. In this case, a three-dimensional model is generated based on the image obtained by capturing the sumo ring (=structure) alone and the obtained three-dimensional shape of the sumo ring is handled as a background.

Figure 13A:
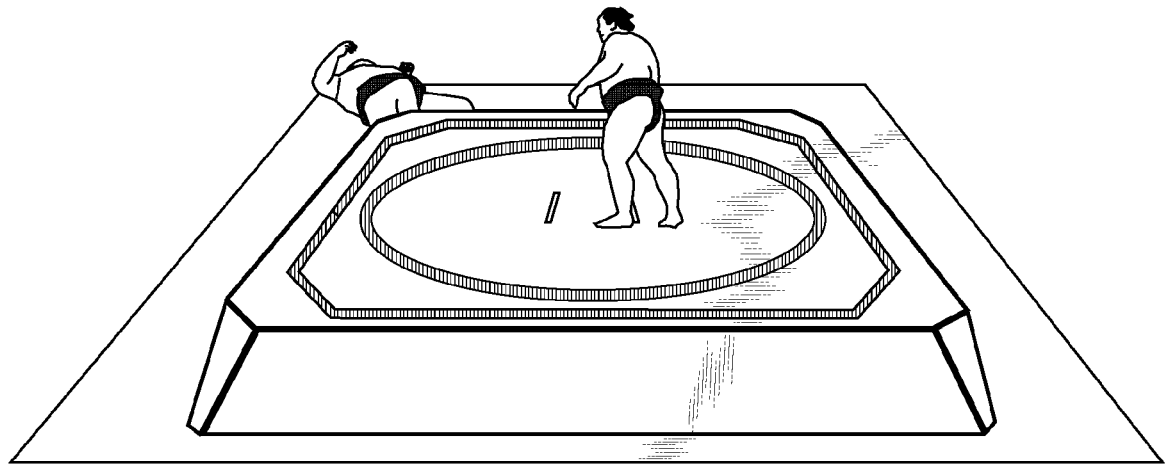
FIG. 13A is a diagram explaining a problem of a conventional method.
Figure 13B:
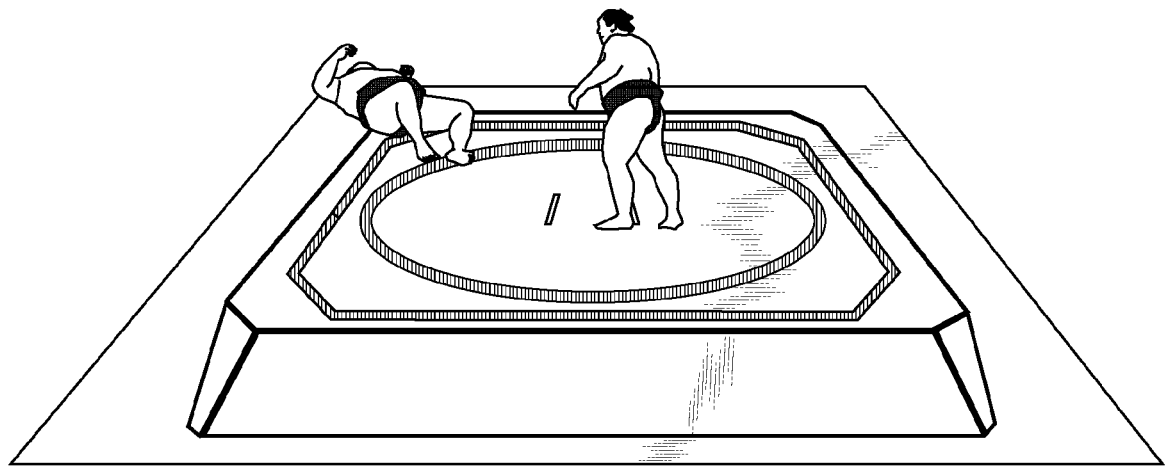
FIG. 13B is a diagram explaining a problem of a conventional method.

Here, it is assumed that, for example, one of sumo wrestlers fell down from the sumo ring as a result of the fight between the two sumo wrestlers as shown in FIG. 13A. A case is considered where the state in FIG. 13A is captured by a total of the ten camera systems 110$a$ to 110$j$ and only the image data of the foreground is transmitted to the server 140. The server 140 having received the image data of the foreground maps the two sumo wrestlers, who are the foreground, onto the three-dimensional model of the sum ring created in advance as the background. As a result of this, an image will be obtained in which the wrestler who was pushed out and fell down from the sumo ring is lying down on the sumo ring. That is, in a case where the structure whose three-dimensional model is generated is handled as a background, a natural virtual viewpoint image is not obtained depending on the position of the foreground. Consequently, in a case where a structure model is handled as a background, it is desirable to determine in advance whether a natural virtual viewpoint image is obtained and issue a warning to a user in a case where the possibility that an unnatural virtual viewpoint image is obtained is strong.

Figure 14:
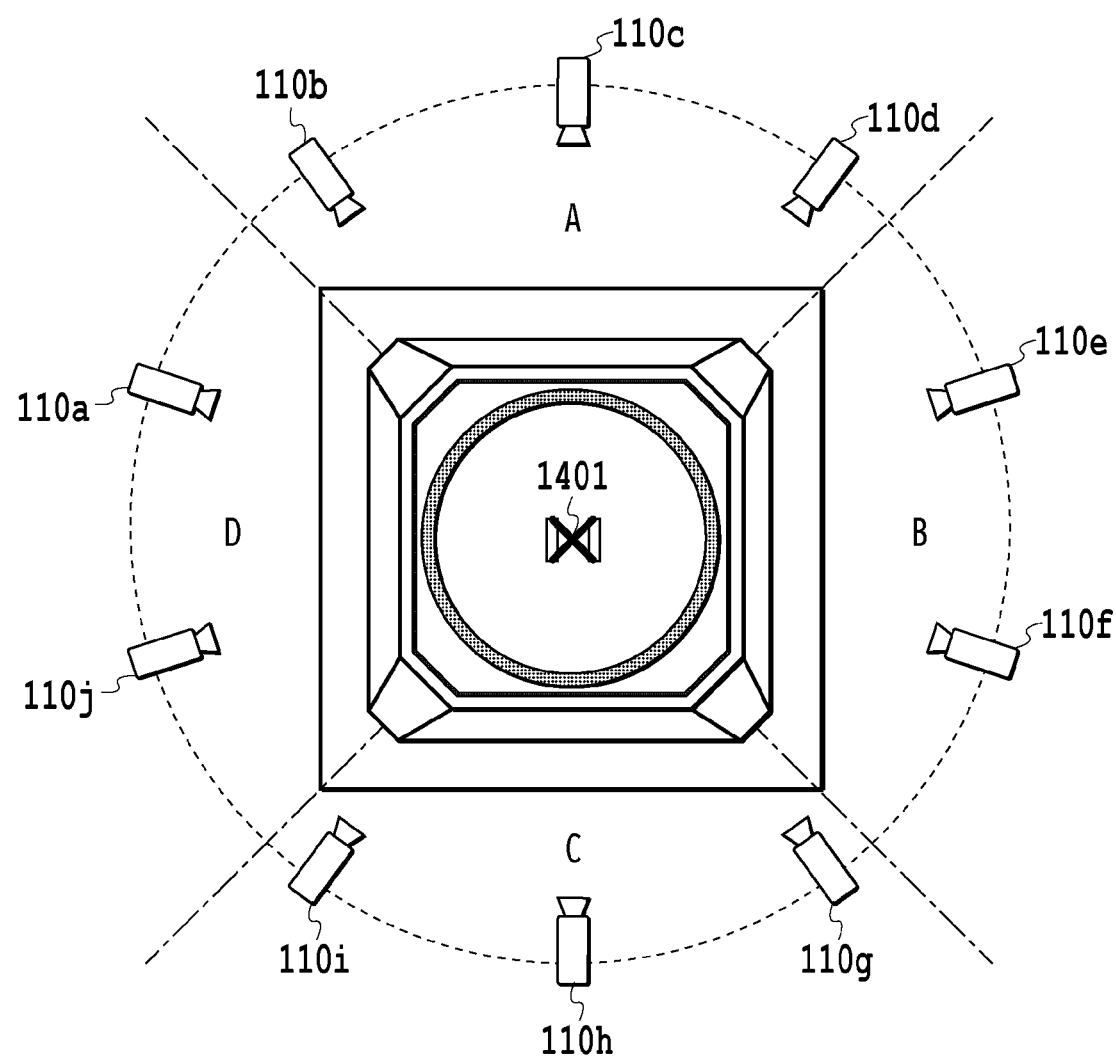
FIG. 14 is a diagram showing that the periphery of a sumo ring is divided into four areas on a bird's eye diagram in a case where the sumo ring is viewed from directly above.

FIG. 14 is a bird's eye diagram in a case where the sumo ring is viewed from directly above and the periphery of the sumo ring is divided into four areas A, B, C, and D. Each of the areas A, B, C, and D indicates the portion below the sumo ring (outside the sumo ring). A × mark at the center is the gaze point of the image capturing units 111$a$ to 111$j$ within the camera systems 110$a$ to 110$j$. In the present modification example, in a case where instructions to generate a virtual viewpoint image are given, the position of the foreground is checked. In the above-described example, whether the position of the sumo wrestler is on the sumo ring is determined based also on the distance from the specified virtual viewpoint (virtual camera) or the image of a camera that captures a bird's eye view of the entire sumo ring, which is not shown schematically. Then, in a case where at least one of the wrestlers is not on the sumo ring and the position of the specified virtual viewpoint and the position of the wrestler do not exist in the same area of any one of A to D, it is determined impossible to generate a virtual viewpoint image and a warning is issued. The reason is that in a case where the area in which the position of the virtual viewpoint exists and the area in which the position of the sumo wrestler exists are different, such as a case where one is within the A area and the other is in the C area, the possibility that an unnatural virtual viewpoint image in which the sumo wrestler is pasted onto a position different from the actual position is generated is strong. As described above, in a case where a structure model is handled as a background, it is necessary to pay attention thereto.

According to the present embodiment, for the structure, the three-dimensional model thereof is created in advance and the three-dimensional model is handled differently from another foreground model. Due to this, it is made possible to generate a virtual viewpoint image in which a structure within the image capturing scene is represented without a sense of incongruity while suppressing the data transmission amount of the multi-viewpoint image that is the source of the virtual viewpoint image.

Second Embodiment

In the first embodiment, the aspect is such that the data transmission amount is suppressed by separating the structure within the image capturing scene as an object of a unique attribute, which is neither foreground nor background, and generating in advance the three-dimensional model thereof and storing it in the server. Next, an aspect is explained as a second embodiment in which the data transmission amount is suppressed by transmitting data of a structure within the image capturing scene after thinning the data thereof while handling the structure as a foreground. Explanation of the contents in common to those of the first embodiment, such as the system configuration, is omitted or simplified and in the following, different points are explained mainly.

Figure 15:
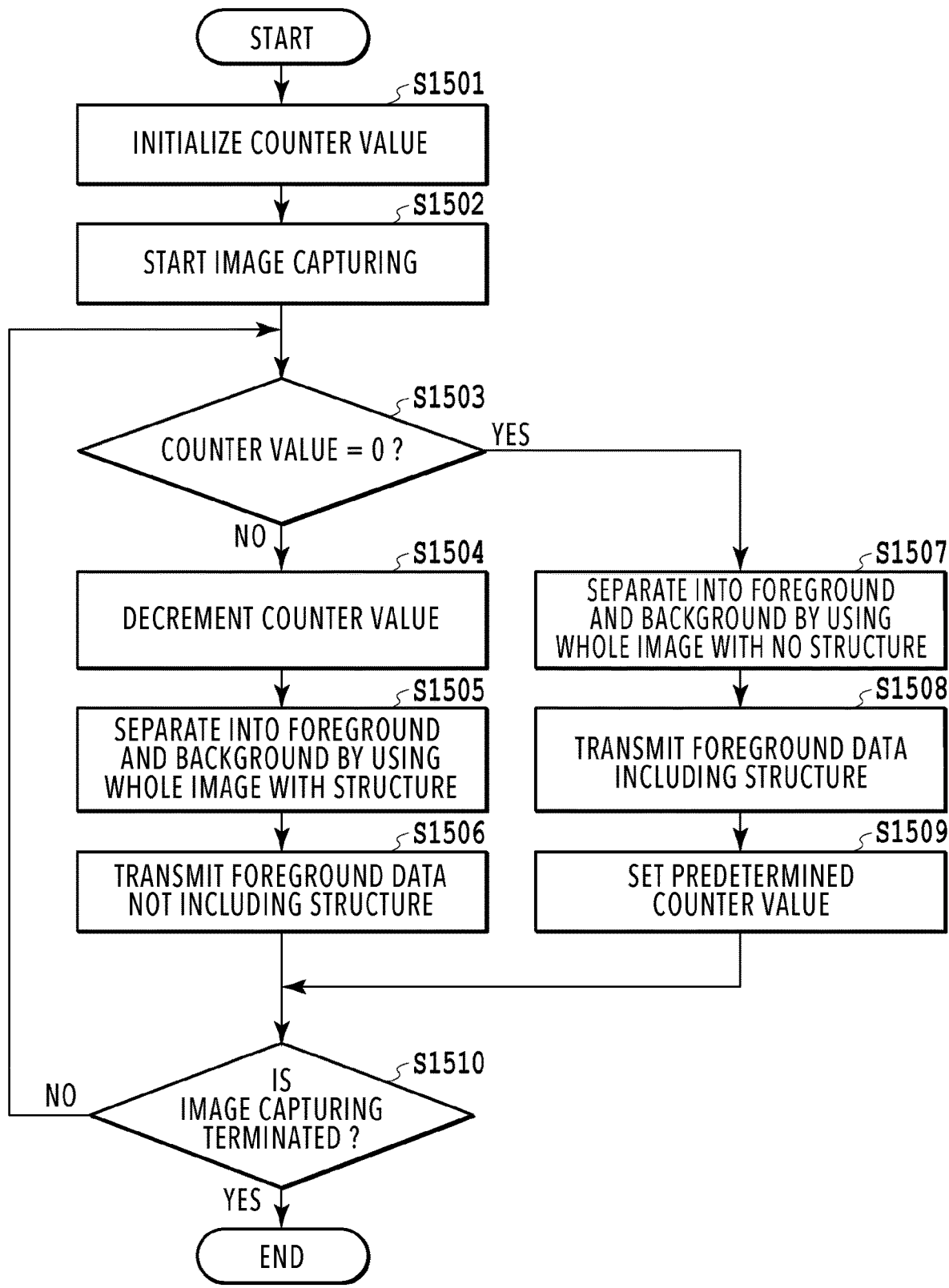
FIG. 15 is a flowchart showing a flow of processing to thin out and transmit image data of a structure portion within an image capturing scene according to a second embodiment.

In the present embodiment also, explanation is given by taking the case where the soccer game is taken as the image capturing scene as an example as in the first embodiment. That is, explanation is given below on the premise that the arrangement of the camera systems is the same as in FIG. 2 described previously. In this case, the soccer goal, which is a structure, is handled as a foreground model, although being distinguished from the players and the ball. FIG. 15 is a flowchart showing a flow of processing to transmit image data of a structure portion within the image capturing scene after thinning the image data according to the present embodiment. The execution of the flow in FIG. 15 is started in each camera system in a case where a user gives instructions to capture a multi-viewpoint image, which is the source of a virtual viewpoint image, via the UI of the control device 130. That is, the flow is implemented by the CPU or the like within the camera adaptor executing a predetermined program.

Here, before the start of execution of the flow in FIG. 15, the preparation processing thereof needs to be completed. Specifically, in each of the camera systems 110*a* to 110*j*, the whole images (see FIG. 7A and FIG. 7B) obtained by capturing the field 200 in the state where there is no structure and in the state where there is a structure are acquired in advance respectively and stored in the memory within each of the camera adaptors 112*a* to 112*j*. This preparation processing is performed in advance at the time of the setup of the sports stadium, for example, before a game is started. The data of these images obtained by the preparation processing is transmitted also to the server 140 and stored in the memory within the server 140 for being referred to in the generation processing of a virtual viewpoint image, to be described later. On the premise of completion of the preparation processing such as this, it is made possible to perform the flow in FIG. 15.

First, at step 1501, in each of the camera adaptors 112*a* to 112*j*, the value of a counter (not shown schematically) included therein is initialized. Specifically, as the initial value, "0" is set. At step 1502 that follows, in each of the image capturing units 111*a* to 111*j*, image capturing in accordance with the time synchronization signal transmitted from the server 140 is started. Next, at step 1503, according to whether or not the current counter value is "0", the following processing is branched. In a case where the counter value is "0", the processing advances to step 1507 and in a case where the counter value is a value other than "0", the processing advances to step 1504.

At step 1504, "1" is subtracted from the counter value (the counter value is decremented). At step 1505 that follows, in each of the camera adaptors 112*a* to 112*j*, processing to extract the foreground area from the image (frame) captured by each of the image capturing units 111*a* to 111*j* is performed. Specifically, processing to find a difference from the captured image (foreground/background separation processing) is performed by using the whole image with a structure of the whole images of two patterns acquired and stored in advance in the preparation processing. Here, in the whole image with a structure of the whole images of two patterns acquired in the preparation processing, the soccer goal 202 as a structure is captured in the state where the soccer goal 202 is installed on the field 200 (FIG. 7B). Consequently, the image obtained by cutting out the area in which only the moving objects, such as players and the ball, are captured not including the soccer goal is obtained as foreground data. Then, at step 1506, each of the camera adaptors 112*a* to 112*j* transmits the foreground data not including the structure, which is obtained at step 1505, to the server 140. After transmission of the foreground data is completed, the processing advances to step 1510 and whether image capturing is terminated is determined. In a case where instructions to terminate image capturing are not received from the server 140, the processing returns to step 1503.

At step 1507, in each of the camera adaptors 112*a* to 112*j*, processing to extract the foreground area from the image (frame) captured by each of the image capturing units 111*a* to 111*j* is performed. Specifically, foreground/background separation processing to find a difference from a captured image is performed by using the whole image with no structure of the whole images of two patterns, which are acquired and stored in advance in the preparation processing. Here, in the whole image with no structure of the whole images of two patterns, which are acquired in the preparation processing, only the field 200 in the state where the soccer goal 202 is not installed yet is captured (FIG. 7A). Consequently, the image is obtained as foreground data, in which not only the area in which the players and the ball are captured but also the area in which the soccer goal is captured is also cut out. That is, at this step, the soccer goal, which is a structure, is also extracted as a foreground. Then, at step 1508, each of the camera adaptors 112*a* to 112*j* transmits "foreground data including a structure" obtained at step 1507 to the server 140. At this time, transmission is performed by giving information indicating the presence/absence of a structure (for example, a binary flag indicating a case where a structure is included by "1" and a case where no structure is included by "0") so that the side of the server 140 having received the data learns that the area of the structure is also included in the foreground data. At step 1509 that follows, a predetermined value N (N>1) is set to the counter. Specifically, in a case where the frame rate of moving image capturing by each of the image capturing units 111*a* to 111*j* is 60 fps, for example, a value such as "60" is set. It is possible for a user to freely change the frequency (once every N times) at which the foreground data including a structure is transmitted by setting the predetermined value to be set to the counter to an arbitrary value. After setting of the predetermined value to the counter is completed, the processing advances to step 1510 and whether image capturing is terminated is determined. In a case where instructions to terminate image capturing are not given by the server 140, the processing returns to step 1503.

The above is the contents of the processing to thin out and transmit image data of the structure portion within the image capturing scene. As a result of performing the processing such as this, for example, in a case where the same value as the value of the frame rate is set to the counter as the predetermined value, the image data of the foreground including a structure (here, soccer goal) is transmitted to the server 140 only once every 60 times. Of course, the moving objects, such as the players and the ball, are transmitted at each of 60 times (for each frame). As described above, it is possible to transmit image information on a structure, which is a stationary object, at a frame rate reduced compared to that of the moving objects, such as the players and the ball, and therefore, it is possible to significantly increase transmission efficiency compared to a case where the image data of the foreground including a structure is transmitted for each frame. Further, by transmitting the foreground image including image information on a structure at a frequency lower than that of the foreground image not including image information on a structure, it is possible to reduce data to be transmitted.

Figure 16:
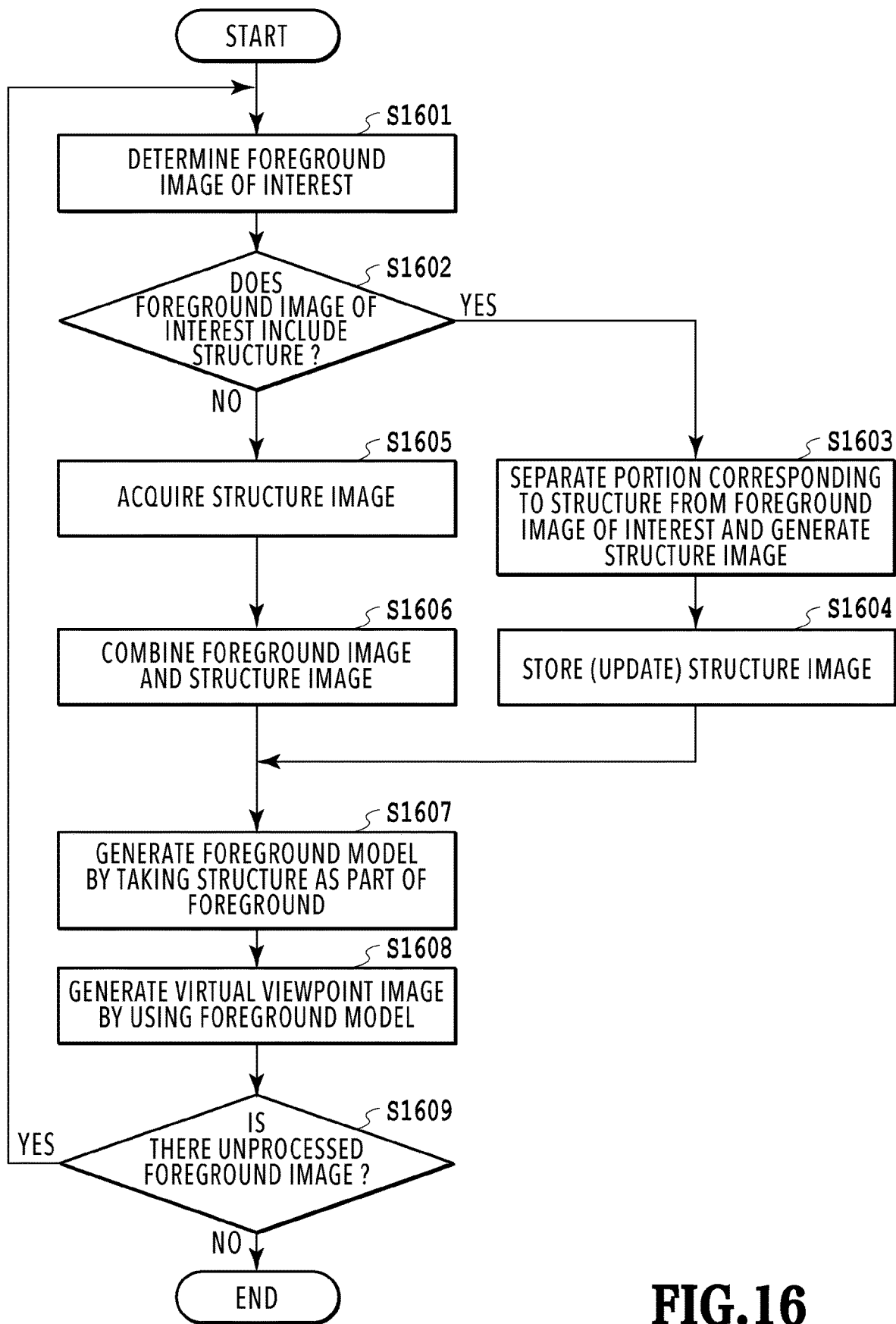
FIG. 16 is a flowchart showing a flow of generation processing of a virtual viewpoint image according to the second embodiment.

Next, processing at the time of generating a virtual viewpoint image by the server 140 based on the image data of the foreground sequentially sent as described above is explained. FIG. 16 is a flowchart showing a flow of generation processing of a virtual viewpoint image in the server 140. The flow in FIG. 16 is performed in units of frames for the foreground image as a target, which corresponds to a specific time frame (for example, corresponding to ten seconds) specified by a user, from the image data of all the foregrounds captured by and transmitted from each of the camera systems 110a to 110j. The series of processing is implemented by the CPU within the server 140 executing a predetermined program based on instructions of the control device 130.

First, at step 1601, of the image data of the foreground corresponding to the set time frame, a foreground image (frame) of interest, which is a processing target, is determined. At step 1602 that follows, whether a structure is included in the foreground image of interest is determined based on the binary flag described previously. In a case where determination results indicate that a structure is included in the foreground image of interest, the processing advances to step 1603 and in a case where no structure is included, the processing advances to step 1605.

At step 1603 in a case where a structure is included in the foreground image of interest, an image area corresponding to the structure is extracted from the foreground image of interest and an image representing the structure (hereinafter, called a "structure image") is generated. This generation processing is performed by a procedure as follows. First, the difference between the captured image (whole image) in the state where there is a structure, which is acquired and stored in advance in the preparation processing described previously, and the foreground image of interest is found, and the image area corresponding to the foreground is taken out. Next, the image area corresponding to the foreground that is taken out and the captured image (whole image) in the state where there is no structure stored in advance are combined. Then, the difference between the combined image obtained by the combination and the foreground image of interest is found and the structure image representing only the image area corresponding to the structure is obtained. Then, at step 1604, the data of the structure image generated at step 1603 is stored in the memory within the server 140. In a case where the data of the structure image is already stored, the data is overwritten (updated) by the data of the structure image generated anew. After the data of the generated structure image is stored in the memory, the processing advances to step 1607.

On the other hand, at step 1605 in a case where no structure is included in the foreground image of interest, the data of the structure image generated and stored in the processing at preceding step 1603 and step 1604 is read. At step 1606 that follows, the read structure image and the foreground image of interest including no structure are combined and the foreground image of interest including the structure is generated.

At step 1607, a three-dimensional model (foreground model) of the object within the image capturing scene, which takes the structure as a part of the foreground, is generated. At this time, at the step in a case where a structure is included originally in the foreground image of interest (Yes at step 1602), the foreground model is generated by using the foreground image of interest as it is. On the other hand, at the step in a case where no structure is included originally in the foreground image of interest, the foreground model is generated by using the foreground image of interest with which the structure is combined at step 1606 is generated. In any case, the foreground model including also the soccer goal, which is a structure (stationary object), in addition to the moving objects, such as the players and the ball, is generated.

At step 1608, based on the position information on the virtual viewpoint set separately by a user, the virtual viewpoint image is generated by estimating the shape in a case where the foreground model generated at step 1607 is viewed from the virtual viewpoint.

The above is the contents of the generation processing of a virtual viewpoint image in the server 140 according to the present embodiment. It is possible to obtain the same effect as that in the first embodiment also by transmitting the image data of a structure within the image capturing scene after thinning the image data while handling the structure as a foreground as in the present embodiment.

Other Embodiments

It is also possible to implement the present invention by processing to supply a program that implements one or more functions of the above-described embodiments to a system or an apparatus via a network or a storage medium and to cause one or more processors in a computer of the system or the apparatus to read and execute the program. Further, it is also possible to implement the present invention by a circuit (for example, ASIC) that implements one or more functions.

The present invention is explained so far with reference to the embodiments, but it is needless to say that the present invention is not limited to the embodiments described above. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising:
one or more memories storing instructions; and
one or more processors configured to execute the instructions to perform operations including:
generating three-dimensional shape data corresponding to a moving object captured from a plurality of directions,
acquiring three-dimensional shape data corresponding to a structure which is different from the moving object and which is captured from the plurality of directions,
acquiring background data corresponding to a background which is different at least from the moving object and the structure and which is captured from the plurality of directions, acquiring information representing a virtual viewpoint, and generating an image based on the generated three-dimensional shape data corresponding to the moving object, the acquired three-dimensional shape data corresponding to the structure, the acquired background data, and the acquired virtual viewpoint information, wherein the generated three-dimensional shape data corresponding to the moving object is generated based on a difference between (A) an image acquired based on first image capturing in a state where the structure and the moving object exist and (B) an image acquired based on second image capturing from the same direction as that of the first image capturing in a state where the structure exist and the moving object does not exist, where a timing which the second image capturing was performed is different from a timing which the first image capturing was performed.

2. The system according to claim 1, wherein the acquired three-dimensional shape data corresponding to the structure is generated based on a captured image acquired by image capturing before starting an event where imaging from the plurality of directions is to be performed.

3. The system according to claim 2, wherein the captured image acquired by image capturing before starting the event is (B) the image acquired based on the second image capturing from the same direction as that of the first image capturing in the state where the structure exist and the moving object does not exist.

4. The system according to claim 1,
wherein the acquired three-dimensional shape data corresponding to the structure is acquired by generating based on a plurality of images,
wherein the plurality of images are based on a plurality of captured images acquired by image capturing from the plurality of directions before starting an event, and
wherein an area of the structure is represented by the plurality of images and is distinguished from other areas.

5. The system according to claim 1, wherein the acquired three-dimensional shape data corresponding to the structure is acquired before starting an event.

6. The system according to claim 1, wherein the generated three-dimensional shape data corresponding to the moving object is generated based on (C) a plurality of captured images acquired by image capturing from the plurality of directions after starting an event.

7. The system according to claim 6, wherein each of (C) the plurality of captured images is a captured image including the moving object, the structure, and the background.

8. The system according to claim 1, wherein the generated three-dimensional shape data corresponding to the moving object is generated based on (C) a plurality of captured images acquired by image capturing from the plurality of directions after starting an event and (D) a plurality of captured images acquired by image capturing from the plurality of directions before starting the event.

9. The system according to claim 1, further comprising a communication path,
wherein the acquired three-dimensional shape data corresponding to the structure, the acquired background data, and the acquired virtual viewpoint information are acquired through the communication path included in the system.

10. The system according to claim 1, wherein the moving object is a person.

11. The system according to claim 1, wherein the moving object is at least one of a person or a ball.

12. The system according to claim 1, wherein the structure is an object whose still state continues.

13. The system according to claim 1, wherein the structure is at least one of a soccer goal configured to be used in a soccer game or a corner flag configured to be used in the soccer game.

14. The system according to claim 1, wherein the structure is an object installed at a predetermined position.

15. The system according to claim 1, wherein the structure is a specified object.

16. The system according to claim 1, wherein at least a part of the structure is configured to be installed on a field having an arrangement configured to receive a person, as the moving object, to play a game.

17. The system according to claim 1, wherein the acquired three-dimensional shape data corresponding to the structure is generated based on a difference between (E) the image acquired based on third image capturing in a state where the structure does not exist and the moving object does not exist and (B) the image acquired based on the second image capturing from the same direction as that of the third image capturing in the state where the structure exist and the moving object does not exist, where the timing which the second image capturing was performed is different from a timing which the third image capturing was performed.

18. A method for a system, the method comprising:
generating three-dimensional shape data corresponding to a moving object captured from a plurality of directions;
acquiring three-dimensional shape data corresponding to a structure which is different from the moving object and which is captured from the plurality of directions;
acquiring background data corresponding to a background which is different at least from the moving object and the structure and which is captured from the plurality of directions;
acquiring information representing a virtual viewpoint; and
generating an image based on the generated three-dimensional shape data corresponding to the moving object, the acquired three-dimensional shape data corresponding to the structure, the acquired background data, and the acquired virtual viewpoint information,
wherein the generated three-dimensional shape data corresponding to the moving object is generated based on a difference between (A) an image acquired based on first image capturing in a state where the structure and the moving object exist and (B) an image acquired based on second image capturing from the same direction as that of the first image capturing in a state where the structure exist and the moving object does not exist, where a timing which the second image capturing was performed is different from a timing which the first image capturing was performed.

19. A non-transitory computer readable storage medium storing a program to cause a computer to perform a method for a system, the method comprising:
generating three-dimensional shape data corresponding to a moving object captured from a plurality of directions;
acquiring three-dimensional shape data corresponding to a structure which is different from the moving object and which is captured from the plurality of directions;
acquiring background data corresponding to a background which is different at least from the moving object and the structure and which is captured from the plurality of directions;

acquiring information representing a virtual viewpoint; and generating an image based on the generated three-dimensional shape data corresponding to the moving object, the acquired three-dimensional shape data corresponding to the structure, the acquired background data, and the acquired virtual viewpoint information, wherein the generated three-dimensional shape data corresponding to the moving object is generated based on a difference between (A) an image acquired based on first image capturing in a state where the structure and the moving object exist and (B) an image acquired based on second image capturing from the same direction as that of the first image capturing in a state where the structure exist and the moving object does not exist, where a timing which the second image capturing was performed is different from a timing which the first image capturing was performed.

* * * * *